UNITED STATES PATENT OFFICE.

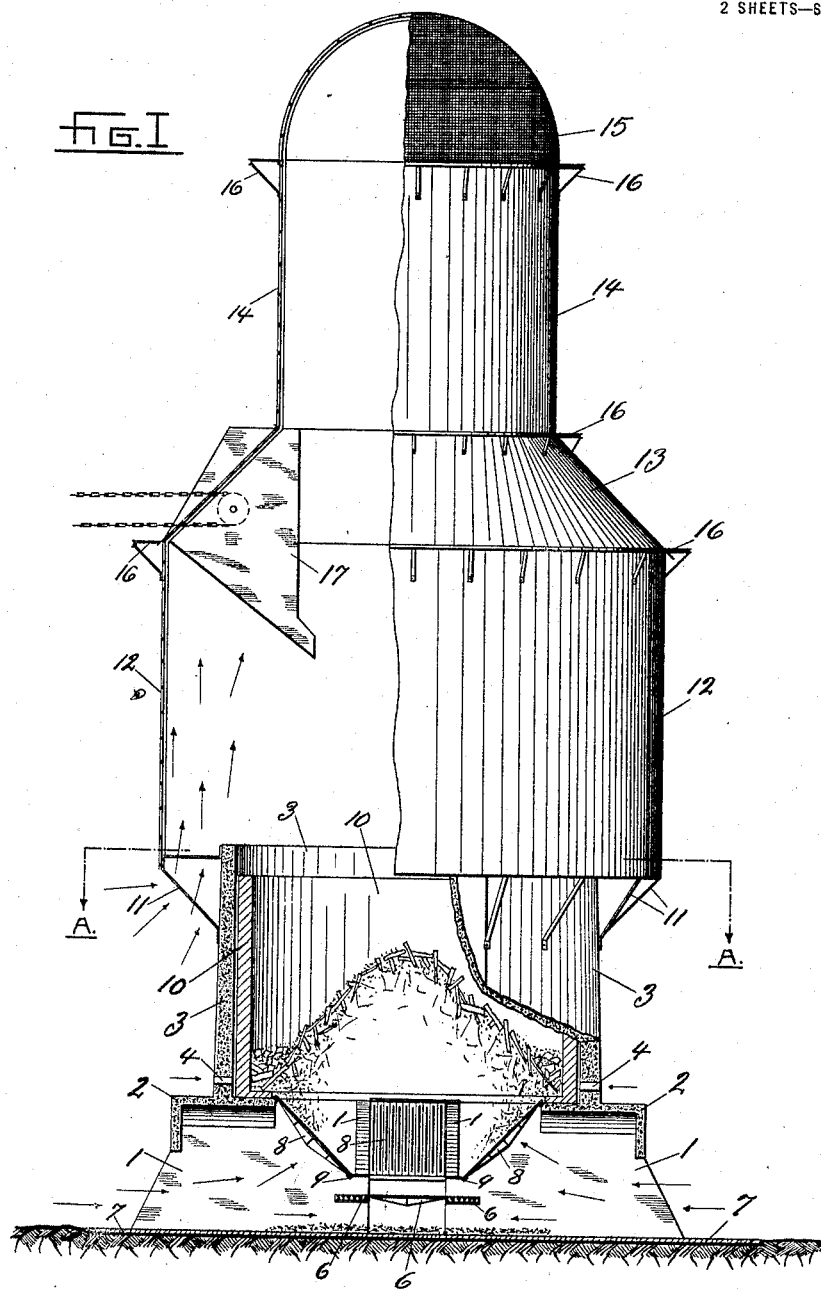

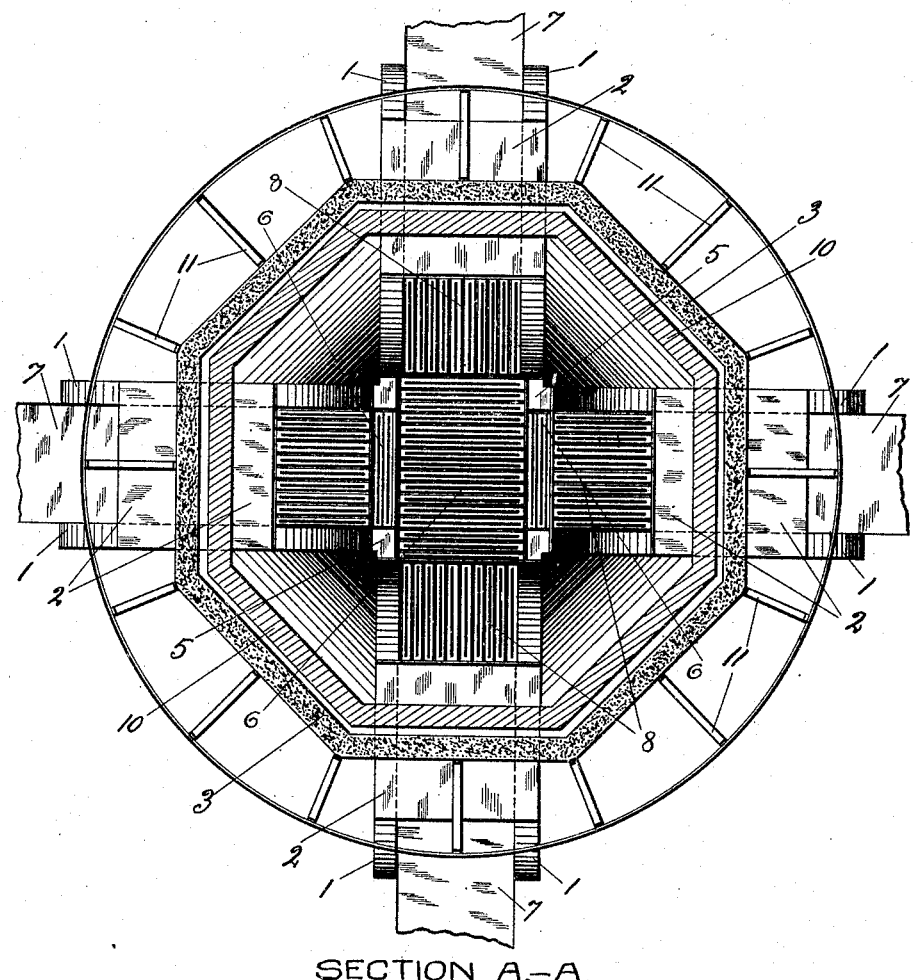

ERNEST L. OEHMEN, OF PORTLAND, OREGON.

REFUSE-FURNACE.

1,303,108.  Specification of Letters Patent.  Patented May 6, 1919.

Application filed March 20, 1917. Serial No. 156,034.

*To all whom it may concern:*

Be it known that I, ERNEST L. OEHMEN, a citizen of Australia, and subject of the King of England, residing in the city of Portland, county of Multnomah, and State of Oregon, have invented certain new and useful Improvements in Refuse-Furnaces, of which the following is a specification.

My invention relates to refuse furnaces, and more particularly to furnaces adapted to be constructed out-of-doors for saw mills and the like, for the purpose of burning up refuse therefrom.

One of the principal objects of my invention is to provide an improved refuse furnace of the character referred to having a base structure with tunnels or passageways thereinto, and having an open top, and adapted to receive a grate structure therein, said grate structure preferably comprising a horizontal grate positioned above the floor of said base structure, with inclined grates at the opposite sides of and above said horizontal grate, whereby an effective draft is created through said tunnel passageways and upwardly through said grate structure.

Another object of my invention is to provide above the base structure a furnace structure, preferably composed of an outer wall and an inner wall spaced therefrom, with means for circulating air between said outer and inner furnace walls, said inner furnace wall being composed of fire-brick or other heat-resisting material, within which and above said grates is formed a substantial combustion chamber, capable of receiving a considerable quantity of refuse, the inner furnace structure being such as will retain an intense heat in the combustion chamber, and thus facilitate a more perfect combustion of the matter discharged thereinto.

Another object of my invention is to provide a sheet metal chimney over said furnace structure and constituting an extension thereof, open at its upper end, and adapted to create a draft upwardly therethrough, said chimney preferably being adapted to admit air thereto from around the outside of the furnace structure, whereby to cause an increased draft or current upwardly through said chimney and thereby tend to effect more nearly a complete combustion.

Another object of my invention is to produce a furnace structure of the character referred to, having a comparatively small base structure, thus requiring only a small area on which to build my improved furnace.

By building a substantial furnace structure of fire-brick, or the like, wholly within which the refuse to be burned is discharged, the intense heat of the inner combustion chamber wall will increase the combustion therein, and a much higher degree of heat is maintained within the combustion chamber than is possible if the combustion chamber were surrounded simply by a sheet metal structure, unless that sheet metal structure were spaced at a considerable distance from the pile of burning refuse.

In order to clearly describe my invention I have illustrated one practical embodiment thereof in the accompanying drawings, which I will now describe.

Figure 1 is a side elevation of a refuse furnace embodying my invention, with parts broken out and in section to show the interior construction and arrangement thereof; and Fig. 2 is a horizontal sectional view thereof taken on line A—A of Fig. 1.

Referring now to the drawings, the foundation, or base structure, of my refuse furnace is preferably formed of concrete and comprises the wall portions, 1—1, of which there are in the embodiment here shown, four pairs spaced apart to form four tunnel-like passageways with cover portions, 2—2, around the top of which is formed the outer concrete furnace structure 3, here shown to be of octagon form, provided with air openings 4—4, as clearly shown in Fig. 1. The wall portions 1—1, of the base structure come together at their inner ends, as at 5—5, and form an effective grate supporting means.

A horizontal grate 6, is supported preferably above the floor 7, of the base-structure, and four inclined grates, as 8—8, are supported at their upper ends by the inner edges of the open middle top portions 2—2, of the base-structure, and at their lower ends upon cross angle bars, as 9—9, at a short distance above the horizontal grate 6.

It will be noted that the horizontal grate 6, extends horizontally beyond the lower ends of the inclined grates and affords a supporting means for the refuse moving down the inclined grates, and onto the horizontal grate. It will also be noted that there are spaces between the lower edges of the inclined grates and the horizontal grate which give easy access to the surface of the horizontal grate and facilitate the matter of removing clinkers, or non-combustible matter.

Within the outer structure wall 3, and spaced therefrom, is an inner structure, or furnace wall 10, constructed of fire-brick or other heat-resisting material, within which and above the grate structure is the combustion chamber of the furnace into which all of the refuse and matter to be burned is discharged.

Supported upon the outer structure 3, by means of suitable brackets, as 11—11, is a cylindrical sheet metal chimney 12, reduced in diameter, as at 13, intermediate its upper and lower ends, whereby the upper portion of said chimney is of less diameter, as at 14, and is provided at its upper end with a spark screen 15. The usual strengthening and stiffening bands 16—16, are provided at different points around the furnace structure. A feed chute 17, is also provided for discharging the refuse through the chimney so that it will drop down into the combustion chamber.

Thus it will be seen that I have provided a furnace structure composed of the outer structure 3, and the inner structure 10, forming an effective combustion chamber, the inner structure 10, being adapted to retain a high degree of heat, which insures more perfect combustion of the refuse discharged thereinto. With the grate arrangement and the tunnel arrangement in the base-structure, a good circulation of air is insured up through the grates and through the matter being consumed. The air space between the inner furnace structure 10, and the outer furnace structure 3, prevents the outer structure from becoming over heated by reason of the circulation of air between said furnace structures, which air enters the air inlets 4—4, and because of the heat there is a constant circulation of air upwardly between said structures.

By constructing the chimney 12, of slightly larger diameter than the furnace structure proper, air can enter and pass upwardly under the lower edge of said chimney, and not only tends to keep the same cool, but will cause a better combustion. With the increased grate area, arranged as shown, and with ample opening tunnel area thereunder, there is good draft upwardly through the grates and through the matter being consumed, caused by the intense heat within the combustion chamber, and the fact that the upper end of the chimney is open.

The tunnel walls 1—1 with their covered portions 2—2, are preferably high enough to permit a person to enter for the purpose of starting the fire on the horizontal grate 6, and for cleaning the grates, which job is rendered easy of accomplishment by the space between the lower edges of the inclined grates and the horizontal grate, which in effect is a supporting platform for the refuse being burned. It will also be noted that the refuse will tend to slide down the inclined grates 8—8, onto the horizontal grate, thus keeping the inclined grates clean.

I am aware that changes can be made in my refuse furnace as here shown for purposes of illustration, without departing from the spirit thereof, and I do not, therefore, limit the invention to the particular form here shown, except as I may be limited by the hereto appended claims.

I claim:

1. A refuse furnace of the character referred to comprising a base structure above the ground having tunnels or passageways therethrough, and a centrally open top giving access to the exterior and interior of a grate, a grate structure therein, adapted to receive matter through said open top, said grate structure comprising a central horizontal grate and upwardly inclined grates at opposite sides thereof directing material on to said horizontal grate, a furnace wall upon said base structure around the open top thereof, and forming a combustion chamber above said grate structure, and a chimney structure of larger diameter and forming an extension above said furnace wall and open at its upper and lower ends.

2. A refuse furnace of the character referred to comprising a base structure above the ground having tunnels or passageways therethrough, and a centrally open top giving access to the exterior and interior of a grate, a grate structure therein, adapted to receive matter through said open top, said grate structure comprising a central horizontal grate supported above the floor of said base structure, and upwardly inclined grates at opposite sides of and above said horizontal grate directing material on to said horizontal grate, a furnace wall upon said base structure around the open top thereof, and forming a combustion chamber above said grate structure, and a chimney structure of larger diameter and forming an extension above and supported by said furnace wall and open at its lower end around the outside of said furnace wall.

3. A refuse furnace of the character referred to comprising a base structure having tunnels therethrough and a centrally open top giving access to the exterior and interior of a grate, a grate structure of hopper form therein below said open top and adapted to receive matter through said open top, a furnace structure upon said base structure comprising an outer furnace wall and an inner furnace wall spaced therefrom, whereby to admit air between said furnace walls, said furnace structure forming a combustion chamber above said grate structure, and a chimney structure of larger diameter forming an extension above said furnace structure and open at its lower end around the outside of said furnace wall.

4. A refuse furnace of the character referred to comprising a base structure having tunnels leading therethrough and a centrally open top giving access to the exterior and interior of a grate, a grate structure of hopper form therein and below the open top thereof supported above the floor thereof and adapted to receive matter through said open top, a furnace structure upon said base structure comprising an outer furnace wall and an inner furnace wall spaced therefrom, whereby to admit air between said furnace walls, said furnace structure forming a combustion chamber above said grate structure, and a chimney structure of larger diameter forming an extension above said furnace structure and open at its lower end around the outside of said furnace wall.

5. A refuse furnace of the character referred to comprising a base structure having tunnels leading therethrough and a centrally open top giving access to the exterior and interior of a grate, a grate structure supported below said open top in said tunnels and adapted to receive matter through said open top, said grate structure comprising a horizontal grate and upwardly and outwardly inclined grates at opposite sides thereof and supported thereabove, a furnace structure upon said base structure comprising an outer furnace wall and an inner furnace wall spaced therefrom, whereby to admit air between said furnace walls, said furnace structure forming a combustion chamber above said grate structure, and a chimney structure forming an extension above said furnace structure and open at its upper and lower ends.

6. A furnace of the character referred to comprising a base structure having tunnels passing therethrough and having its middle top portion open, whereby to give access to the exterior and interior of a grate structure, a horizontal grate supported in the middle of said base structure above the floor thereof, upwardly and outwardly inclined grates above said horizontal grate and forming the sides of a grate structure, a furnace wall around said base above said grates, a chimney structure of larger diameter than said furnace wall supported by the latter, and open at its lower end around the top of said furnace wall, said chimney structure being reduced in diameter toward its upper end and provided with a fire screen, and means for discharging refuse through the side of said chimney, substantially as described.

7. A furnace of the character referred to comprising a base structure having tunnels passing therethrough and having its middle top portion open, whereby to give access to the exterior and interior of a grate structure, a horizontal grate supported in the middle of said base structure above the floor thereof and inclined grates extending from the top of said base structure to a space above said horizontal grate, a double wall furnace structure upon said base structure around said open top and having an air space between the walls thereof, with means for admitting air thereto, a cylindrical sheet metal chimney supported over said furnace structure and of larger diameter, whereby to admit air thereto under the lower edge thereof and around the outside of said furnace structure, said chimney structure being reduced in diameter toward its upper end and provided with a fire screen, and means for discharging refuse through the side of said chimney into said furnace structure and upon said grate structure, substantially as described.

Signed at Portland, Multnomah county, Oregon, this 14 day of March, 1917.

ERNEST L. OEHMEN.

In presence of—
V. B. MILLER,
I. M. GRIFFIN.

Copies of this patent may be obtained for five cents each, by addressing the "Commissioner of Patents, Washington, D. C."